(12) United States Patent
Sepke

(10) Patent No.: US 6,829,804 B2
(45) Date of Patent: Dec. 14, 2004

(54) FILTRATION ARRANGEMENT OF A VACUUM CLEANER

(75) Inventor: Arnold L. Sepke, Hudson, IL (US)

(73) Assignee: White Consolidated, Ltd., Cleveland, OH (US)

(*) Notice: Subject to any disclaimer, the term of this patent is extended or adjusted under 35 U.S.C. 154(b) by 301 days.

(21) Appl. No.: 10/106,268

(22) Filed: Mar. 26, 2002

(65) Prior Publication Data

US 2003/0182757 A1 Oct. 2, 2003

(51) Int. Cl.⁷ .................... A47L 9/10; B01D 45/12
(52) U.S. Cl. ...................... 15/347; 15/352; 15/353; 55/317; 55/459.1; 55/459.3; 55/DIG. 3
(58) Field of Search ............. 15/350–353, 347; 55/337, 459.1, 459.3, DIG. 3

(56) References Cited

U.S. PATENT DOCUMENTS

| 5,541 A | 5/1848 | McCleary |
|---|---|---|
| 446,053 A | 2/1891 | Bittinger |
| 458,773 A | 9/1891 | Lee |
| 815,967 A | 3/1906 | Lynch |
| 941,675 A | 11/1909 | Green |
| 950,767 A | 3/1910 | Dunlap |
| 963,139 A | 7/1910 | Griffiths |
| 971,895 A | 10/1910 | Joedicke |
| 1,003,844 A | 9/1911 | Winans |
| 1,010,466 A | 12/1911 | Lee |
| 1,029,562 A | 6/1912 | Prentiss |
| 1,127,896 A | 2/1915 | Keller |
| 1,133,543 A | 3/1915 | Duffie |
| 1,167,219 A | 1/1916 | Replogle |
| 1,188,834 A | 6/1916 | Riordan |
| 1,230,827 A | 6/1917 | Duffie |
| 1,234,095 A | 7/1917 | Duffie |
| 1,276,016 A | 8/1918 | Bennett |
| 1,420,665 A | 6/1922 | Newcombe |
| 1,464,741 A | 8/1923 | Bennett |

(List continued on next page.)

FOREIGN PATENT DOCUMENTS

| DE | 398849 | 7/1924 |
|---|---|---|
| DE | 570610 | 2/1933 |

(List continued on next page.)

OTHER PUBLICATIONS

IonaCare Fantom™ Model F–9000 Owner's Manual (© 1991).

(List continued on next page.)

Primary Examiner—Robert J. Warden, Sr.
Assistant Examiner—Laura C Cole
(74) Attorney, Agent, or Firm—Pearne & Gordon LLP

(57) ABSTRACT

A filtration arrangement of a vacuum cleaner includes a floor-engaging base unit, a body portion pivotally mounted on the base unit and a suction motor/fan assembly located in either the base unit or body portion. A dustcup is mounted on the body portion and is in fluid communication with a first air path so as to receive dirt laden air therefrom. A cyclonic member is disposed over the dustcup and is effective for imparting rotational motion to the dirt laden air entering the dustcup. An air tube is mounted centrally within the dustcup and extends from the bottom of the dustcup to an area near the top of the dustcup. A removable filter member is disposed over the top portion of the air tube. The removable filter has a central opening that cooperatively engages the top portion of the air tube to establish a second air path that extends from inside the dustcup to outside atmosphere through the suction motor/fan assembly.

35 Claims, 7 Drawing Sheets

U.S. PATENT DOCUMENTS

| | | |
|---|---|---|
| 1,507,271 A | 9/1924 | Bennett |
| 1,565,318 A | 12/1925 | Fisher |
| 1,644,092 A | 10/1927 | Shinn |
| 1,759,947 A | 5/1930 | Lee |
| 1,871,111 A | 8/1932 | Campbell |
| 1,887,600 A | 11/1932 | Replogle |
| 2,026,834 A | 1/1936 | Holly |
| 2,118,167 A | 5/1938 | Connor |
| 2,193,479 A | 3/1940 | Donaldson |
| 2,230,264 A | 2/1941 | Replogle |
| 2,252,581 A | 8/1941 | Saint-Jacques |
| 2,276,844 A | 3/1942 | Holm-Hansen |
| 2,402,845 A | 6/1946 | Rodman |
| 2,475,808 A | 7/1949 | Storm |
| 2,482,166 A | 9/1949 | Gage |
| 2,524,117 A | 10/1950 | Storm |
| 2,604,956 A | 7/1952 | Israel |
| 2,648,396 A | 8/1953 | Kirby |
| 2,934,494 A | 4/1960 | Kleiber |
| 2,979,159 A | 4/1961 | Pritchard et al. |
| 3,234,713 A | 2/1966 | Harper et al. |
| 3,320,727 A | 5/1967 | Farley |
| 3,423,909 A | 1/1969 | Bennett |
| 3,425,192 A | 2/1969 | Davis |
| 3,543,325 A | 12/1970 | Hamrick |
| 3,626,545 A | 12/1971 | Sparrow |
| 3,672,130 A | 6/1972 | Sullivan |
| 3,835,626 A | 9/1974 | Miyake et al. |
| 3,870,486 A | 3/1975 | Eriksson et al. |
| 3,877,902 A | 4/1975 | Eriksson et al. |
| 3,959,844 A | 6/1976 | Cyphert |
| 4,108,778 A | 8/1978 | Lambert |
| 4,172,710 A | 10/1979 | van der Molen |
| 4,373,228 A | 2/1983 | Dyson |
| 4,393,536 A | 7/1983 | Tapp |
| 4,490,162 A | 12/1984 | Davis |
| 4,571,772 A | 2/1986 | Dyson |
| 4,593,429 A | 6/1986 | Dyson |
| 4,853,008 A | 8/1989 | Dyson |
| 4,944,780 A | 7/1990 | Usmani |
| 5,020,186 A | 6/1991 | Lessig, III |
| 5,078,761 A | 1/1992 | Dyson |
| 5,080,697 A | 1/1992 | Finke |
| 5,101,532 A | 4/1992 | Dyson et al. |
| 5,106,488 A | 4/1992 | Jonasson |
| 5,135,552 A | 8/1992 | Weistra |
| 5,141,528 A | 8/1992 | Boczkiewicz et al. |
| 5,160,356 A | 11/1992 | Dyson |
| 5,230,722 A | 7/1993 | Yonkers |
| 5,248,323 A | 9/1993 | Stevenson |
| 5,255,411 A | 10/1993 | Da Costa |
| 5,267,371 A | 12/1993 | Soler |
| 5,287,591 A | 2/1994 | Rench et al. |
| 5,307,538 A | 5/1994 | Rench et al. |
| 5,350,432 A | 9/1994 | Lee |
| 5,558,697 A | 9/1996 | Dyson et al. |
| 5,603,740 A | 2/1997 | Roy |
| 5,725,623 A | 3/1998 | Bowerman et al. |
| 5,746,795 A | 5/1998 | Witter |
| 5,779,745 A | 7/1998 | Kilström |
| 5,795,358 A | 8/1998 | Scanlon et al. |
| D398,097 S | 9/1998 | Murphy et al. |
| 5,840,103 A | 11/1998 | Dyson |
| 5,853,440 A | 12/1998 | Dyson |
| 5,858,038 A | 1/1999 | Dyson et al. |
| 5,893,936 A | 4/1999 | Dyson |
| 5,935,279 A | 8/1999 | Kilström |
| 5,950,274 A | 9/1999 | Kilström |
| 6,003,196 A | 12/1999 | Wright et al. |
| 6,012,200 A | 1/2000 | Murphy et al. |
| 6,026,540 A | 2/2000 | Wright et al. |
| 6,070,291 A | 6/2000 | Bair et al. |
| 6,085,382 A | 7/2000 | Bobrosky et al. |
| D433,201 S | 10/2000 | Wright et al. |
| 6,141,826 A | 11/2000 | Conrad et al. |
| 6,146,434 A | 11/2000 | Scalfani et al. |
| 6,192,550 B1 | 2/2001 | Hamada et al. |
| 6,260,234 B1 | 7/2001 | Wright |
| 6,269,518 B1 | 8/2001 | Yung |
| 6,334,234 B1 | 1/2002 | Conrad et al. |
| 6,341,404 B1 | 1/2002 | Salo et al. |
| 6,383,266 B1 | 5/2002 | Conrad et al. |
| 6,428,589 B1 * | 8/2002 | Bair et al. .................... 55/318 |
| 6,436,160 B1 * | 8/2002 | Stephens et al. .............. 55/337 |
| 2003/0131441 A1 * | 7/2003 | Murphy et al. ................ 15/350 |

FOREIGN PATENT DOCUMENTS

| | | |
|---|---|---|
| DE | 1133181 | 7/1962 |
| EP | 0 018 197 | 10/1980 |
| EP | 0 802 762 | 10/1998 |
| EP | 0 757 536 | 4/1999 |
| EP | 1 000 579 A3 | 5/2000 |
| EP | 0 836 827 | 11/2000 |
| EP | 1 157 650 | 11/2001 |
| EP | 1 157 651 | 11/2001 |
| EP | 1 163 873 | 12/2001 |
| EP | 0 942 785 | 2/2002 |
| EP | 0 885 585 | 4/2002 |
| EP | 1 195 125 | 4/2002 |
| EP | 1 199 023 | 4/2002 |
| FR | 1468142 | 12/1966 |
| GB | 479455 | 2/1938 |
| GB | 1049292 | 11/1966 |
| GB | 1111074 | 4/1968 |
| GB | 2246717 | 2/1992 |
| GB | 2265096 | 9/1993 |
| GB | 2298598 | 9/1996 |
| GB | 2344745 | 6/2000 |
| GB | 2367484 | 4/2002 |
| JP | 54-121568 | 2/1979 |
| JP | 4-231016 | 8/1992 |
| JP | 7-124076 | 5/1995 |
| WO | WO 99/22873 | 5/1999 |
| WO | WO 99/22874 | 5/1999 |
| WO | WO 99/59458 | 11/1999 |
| WO | WO 00/21428 | 4/2000 |
| WO | WO 00/36962 | 6/2000 |
| WO | WO 00/64321 | 11/2000 |

OTHER PUBLICATIONS

Fantom™ Vacuum Cleaner Service Manual for Iona ™ Model Series F–9000.

Fantom® Owner's Manual (© 1993).

Fantom® Fury™ Vacuum Owner's Manual (© 1995).

Fantom® Thunder™ Vacuum Owner's Manual (© 1997).

Dyson DC03 Operating Manual (© 1997).

Eureka Lightweight Upright Vacuum Cleaner Owner's Guide 410 Series (© 2000).

Eureka Vacuum Cleaner Model 410 design on sale late 2000 (9 Pictures).

Entstaubungstechnik, by Dr. Ing. Wilhelm Batel, 1972.

"Research and Development of the Third Stage Multicyclone Separator in FCC Power Recovery Systems" by Yaodong, et al. Proceedings of INTERPEC China '91.

"Cyclone Dust Collectors" by Professor A. J. Ter Linden, Engineering (London), Jan.–Jun. 1949, vol. 167, pp. 165–168.

"The Application of Gas/Liquid Cyclones in Oil Refining" by Van Dongen, et al., *Transations of the ASME*, Jan., 1958, pp. 245–251.

"On Problem of Wear in Centrifugal Separators" by Dipl.—Ing. Otakar Štorch C. Sc. And Dipl.—Ing. K. Pojar *Staub–Reinhalst.Luft*. vol. 30, No. 12, Dec. 1970, pp. 5–12.

Gas Cyclones and Swirl Tubes, by Hoffmann, et al., Springer–Verlag Berlin Heidelburg New York, 2002.

"Fundamentals of Cyclone Design and Operation" by R. McK. Alexander, Proceedings Aus. I.M.M. (Inc.) pp. 203–228.

"Chapter 6: Centrifugal Separators" Industrial Gas Cleaning Second Edition, by W. Strauss, Pergamon Press, 1975, pp. 216–276.

"Unconventional cyclone separators" by P. Schmidt, *International Chemical Engineering*, vol. 33, No. 1, Jan. 1993, pp. 8–17.

* cited by examiner though a cleaning operation on the filter configuration. Of course, it would be more advantageous if such a bagless vacuum cleaner provided a filter configuration that would be easier for a consumer to operate and would not suffer from a reduced fill volume and strained, turbulent air path that results from the configuration of the Hamada patent.

FILTRATION ARRANGEMENT OF A VACUUM CLEANER

BACKGROUND OF THE INVENTION

The present invention relates to a filtration arrangement of a vacuum cleaner, and more particularly to such a vacuum cleaner having a more direct air path to the suction motor and further, wherein the filter member is positioned at the top of the dustcup.

Many vacuum cleaners sold today are of the "bagless" variety as opposed to the more traditional bagged vacuum cleaner that requires the consumer to change the filter bag periodically. With a bagless vacuum cleaner there is typically provided a transparent non-permeable reservoir referred to herein as a "dustcup." The dustcup can be easily removed and emptied into a trash receptacle. Additionally, the dustcup is usually made of a transparent or translucent plastic material thus giving the consumer the ability to view the cleaning action and to view when the dustcup is in need of emptying. In the operation of a bagless vacuum cleaner, working air created by the suction source enters a nozzle and carries dust and debris into a cyclone so that it can be deposited into the dustcup. A filter or filters in the system may be provided to assist in the final separation of fine dust that may not have been completely removed by the cyclonic action. From such a filter assembly, clean air is then ultimately expelled to atmosphere.

An example of a bagless vacuum cleaner of this type can be found in U.S. Pat. No. 6,070,291 issued to Bair et al. on Jun. 6, 2000. In this patent, a vacuum cleaner dirt container has an inlet at the top and a suction motor located directly beneath the container. A cylindrical filter element extends centrally within the container from top to bottom. Air enters the top inlet of the container, circles the filter element, enters the filter element and then travels through an internal passage of the filter to the bottom of the container and into the suction motor. There are several disadvantages with this approach. First, by disposing the filter element so that it extends from the top to the bottom of the container, the bottom portion of the filter can clog since it is in direct contact with the larger particles of dust and debris deposited during the cyclonic cleaning operation. Also, the space occupied by the filter element diminishes the fill volume of the container and further, results in a strained, turbulent air path within the dirt container. Accordingly, it would be advantageous to provide a bagless vacuum cleaner that included a filter arrangement that resides away from the bottom of the dirt container thus allowing for the maximum fill volume within the container and further, achieved such a filter function in a way to maintain a non-turbulent air path within such container.

Another example of a similar bagless vacuum cleaner can be found in U.S. Pat. No. 6,192,550 issued to Hamada et al. on Feb. 27, 2001. In this patent, it can be seen that a filter portion is mounted at a higher position within the dirt container. Although the Hamada vacuum cleaner contains an elevated filter portion, such elevated filter portion is only one part of a complex filter arrangement that includes a pre-filter that completely surrounds the main filter. Such a configuration has the effect of reducing the fill volume within the dirt container and of contributing to a strained turbulent air path within the dirt container. Additionally, such a filter configuration, because of its complexity, will require the operator to conduct a multi-step operation each and every time it is necessary to empty the dirt container and perform

SUMMARY OF THE INVENTION

In accordance with the principles of the present invention, there is provided a filtration arrangement of a vacuum cleaner comprising a floor engaging base unit, a body portion pivotally mounted on said base unit, and a suction motor/fan assembly mounted in one of the base unit and body portion. A dirt receptacle or dustcup is mounted on the body portion, and a cover member is sealingly mounted on the dirt receptacle. A first air path extends from the base unit to the cover member. The cover member comprises a curved inclined channel for imparting rotational motion to airflow entering the cover member from the first air path. An air tube is disposed centrally within the dirt receptacle and extends from a bottom end of the dirt receptacle toward a top end of the dirt receptacle. A removable filter mounted over a top portion of the air tube. The removable filter comprises an inner diameter opening that fits over the air tube in a manner to establish a second air path from the dirt receptacle to outside atmosphere through the suction motor/fan assembly.

According to another aspect of the invention, the vacuum cleaner further comprises a HEPA filter disposed between the suction motor/fan assembly and atmosphere.

DETAILED DESCRIPTION OF THE INVENTION

Figure 1:
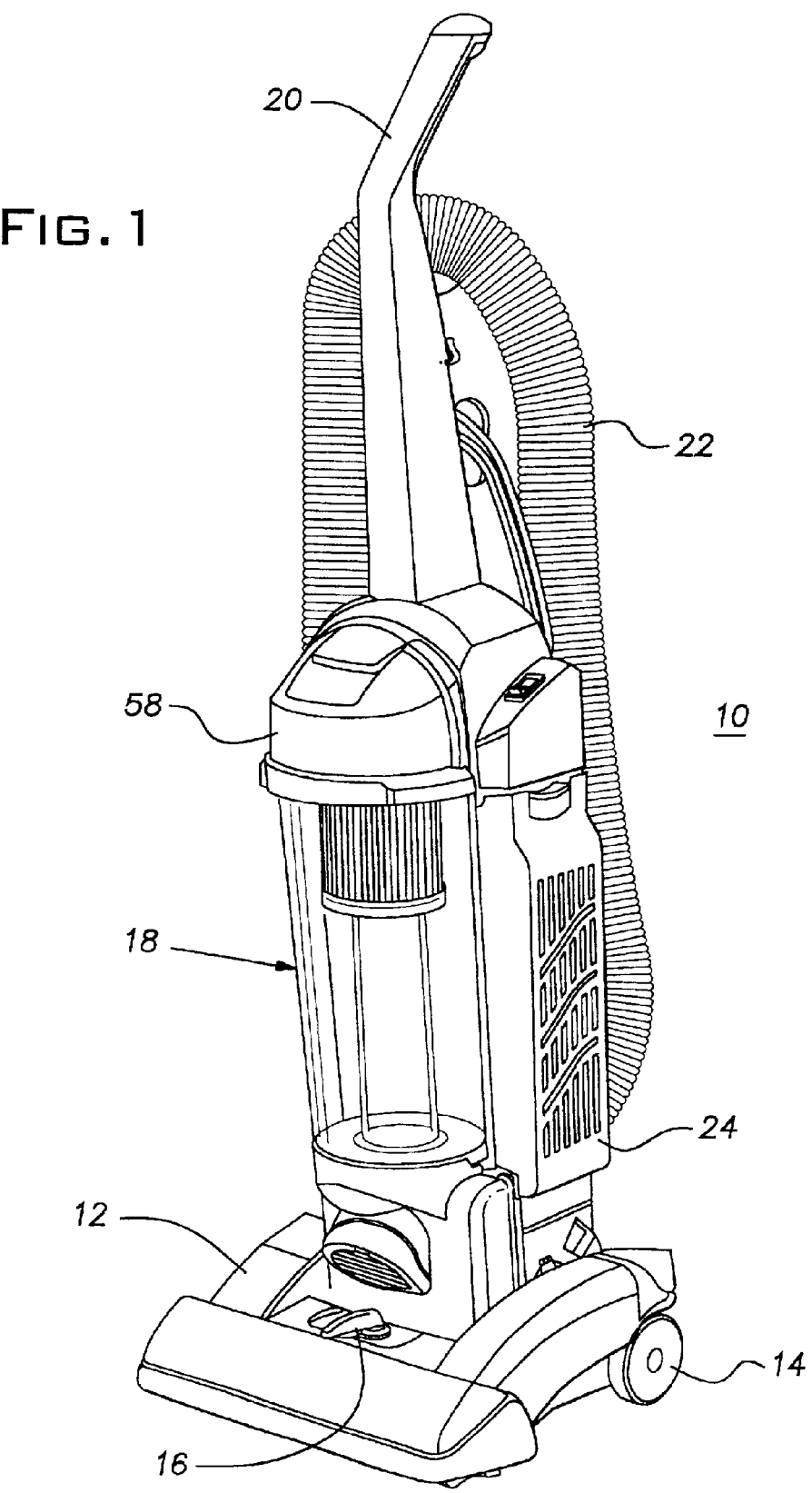
FIG. 1 is a perspective view of a front of a vacuum cleaner constructed in accordance with the present invention.
Figure 2:
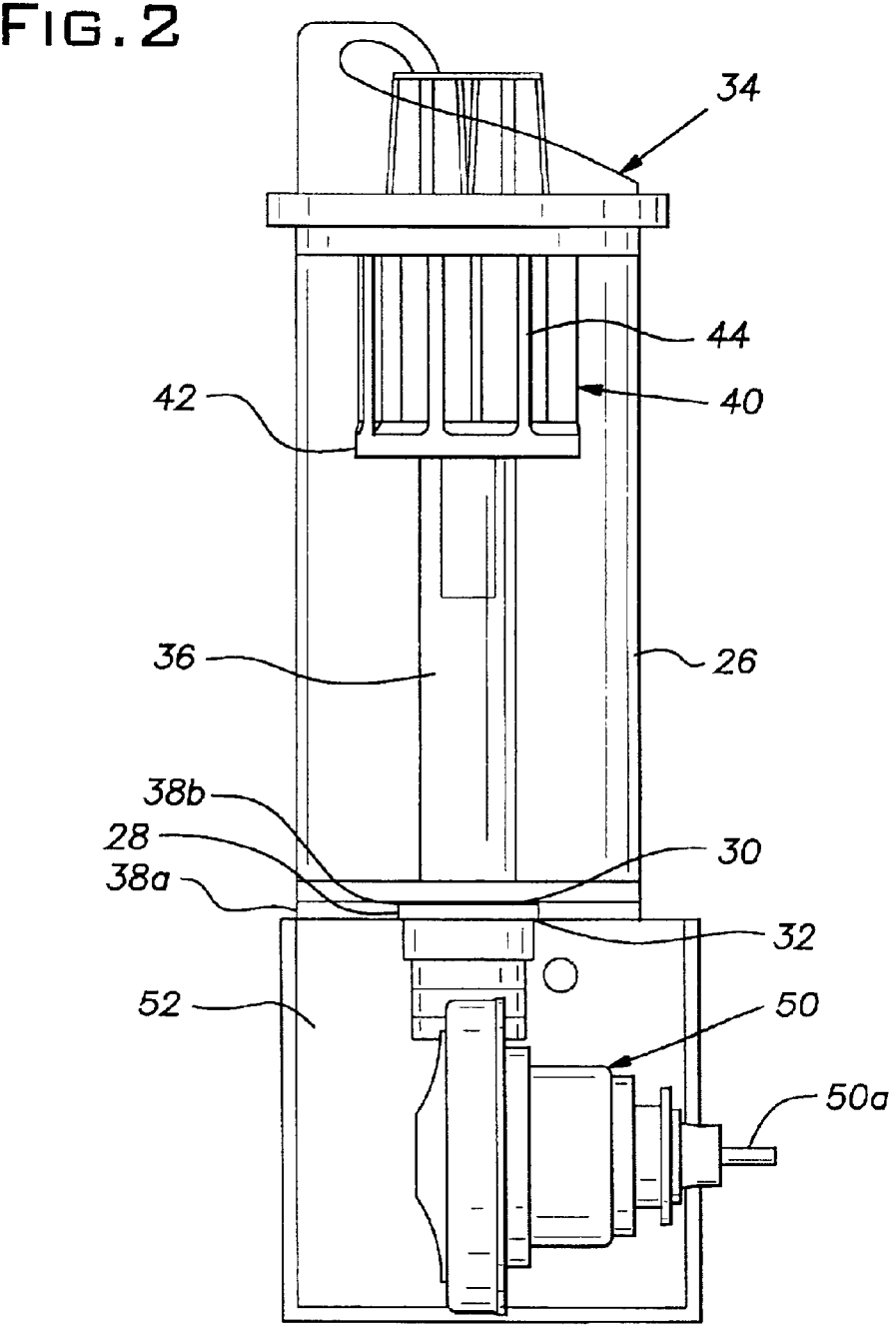
FIG. 2 is a front perspective view of a dustcup, suction motor and cyclonic member assembly portion of the present invention.

As seen in FIG. 1, a vacuum cleaner 10 according to the present invention includes a floor engaging base portion or base unit 12. The base unit 12 can be of a conventional design for upright vacuum cleaners; that is, it will include a brush roll (not shown) that is driven by a drive belt (not shown). The drive belt is driven by a shaft 50*a* that is part of the suction motor/fan assembly 50 as shown in FIG. 2. Additionally, the base unit 12 will include wheels 14 and a height adjuster mechanism 16.

The vacuum cleaner of FIG. 1 further includes a body or housing portion 18 and a handle member 20. A flexible hose member 22 can also be provided; the flexible hose 22 allows the consumer to use on-board tools (not shown) to perform related vacuuming operations for example, upholstery or drapery cleaning using the upright vacuum cleaner 10. A final stage filter 24 is shown mounted on the side of the body portion 18. This final stage filter 24 can be a high efficiency particulate air (HEPA) filter and can serve to perform one last filtering operation on the airstream before it is exhausted to atmosphere. Of course, the final stage filter 24 can be provided using other than a HEPA filter and can be disposed on other portion of the vacuum cleaner 10.

The improved filtration arrangement for vacuum cleaner 10 will now be described with reference to FIG. 2 in which a dustcup 26 is shown disposed directly above the suction motor/fan assembly 50. The suction motor/fan assembly 50 is disposed in a plenum 52 in which the negative pressure, or suction force is created. A gasket or seal member 28 is disposed between an outlet 30 of the dustcup 26 and the input 32 to the plenum 52. As previously discussed, the dustcup 26 is typically constructed of a transparent or translucent plastic material. In this way, the consumer can determine when it is time to empty the dustcup by visually observing when the dirt and/or debris in the dustcup 26 has reached a particular level.

Disposed over the top of and sealingly covering the dustcup 26 is a dustcup cover member 34, or as it will be referred to later, a cyclonic member 34, the operation of which will be described in further detail with respect to FIG. 4. The dustcup 26 has an air tube 36 molded integral to the dustcup 26 although a separate air tube affixed inside the dustcup 26 is a suitable alternate method of construction. The air tube 36 is hollow and is positioned on the axial center of the dustcup 26. The air tube 36 begins at the base of the dustcup 26 and extends upwardly to approximately the height of the top plane of the sidewalls of the dustcup 26. An annular rib 38 is formed on the base of the dustcup 26 and has an outer rib portion 38*a* and an inner rib portion 38*b*. The outer rib portion 38*a* has a flat planar surface that is effective so that the dustcup 26 can sit in a stable, vertical attitude when it is temporarily positioned outside of the body portion 18. The inner rib portion 38*b* surrounds the opening into the air tube 36. The inner rib portion 38*b* cooperatively engages the seal member 28, which is made of an air impermeable, resiliently compressible gasket material. The seal member 28 allows the air tube 36 to be in fluid communication with the suction motor/fan assembly 50.

Surrounding the top portion of the air tube 36 is the filter assembly 40. The bottom portion of the air tube 36 thus remains uncovered resulting in a smooth round exterior surface that assures turbulent-free air dynamics as dirt and debris rotate inside the dustcup 26. The smooth lower portion of the air tube 36 quickly releases accumulated dirt for cleaning and disposal. The filter assembly 40 of the present invention will be described more fully in relation to FIGS. 4, 5*a* and 5*b*. As seen in FIG. 2, the filter assembly 40 includes a filter support member 42; the filter support member 42 can be provided with ribs 44 that extend vertically from the bottom of the filter support member 42 to its topmost region. The ribs 44 of the filter support member 42 can be effective in preventing damage to the filter media, such damage as may occur when the consumer is handling the dustcup 26 during the task of emptying the dirt and debris from the dustcup 26. Of course, it is possible to provide the filter support member 42 with a protective arrangement other than the ribs 44; for instance, it may be possible to provide the protection of the ribs by using a mesh type of configuration or a combination of ribs and mesh material.

Figure 4:
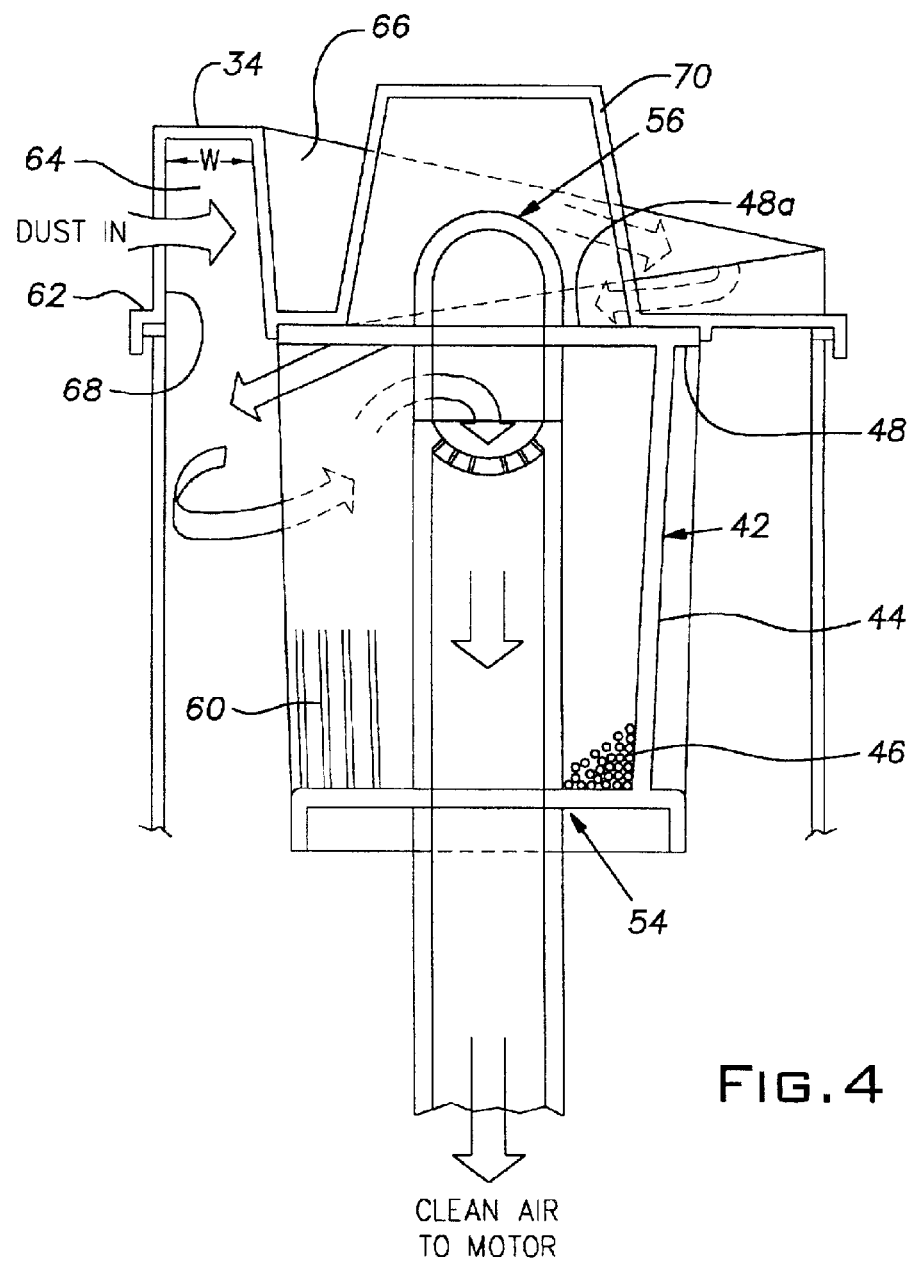
FIG. 4 is a perspective view of a dustcup, cyclonic member and filter assembly portion of the present invention.

Referring now to FIG. 4, it can be seen that the ribs 44 of the filter support member 42 are positioned outside the largest diameter of the filter member 60. The ribs 44 begin at a bottom surface 54 and terminate at the top of the filter support member 42 in the form of a closed ring 48 having a planar surface 48*a*. The bottom surface 54 of the filter support member 42 is of a diameter and size sufficient to support and seal the bottom of the filter member 60 when the filter member 60 is placed on the bottom surface 54. The void areas between the ribs 44 can be filled with a screen 46 that can be molded directly into the form for the filter support member 42 or, can be constructed as a separate part to be installed over the ribs 44 as a sleeve-like structure. The size of the openings in the screen 46 determines the particle size that is allowed to pass through and into the filter member 60. Formed centrally on the closed ring portion 48 is a loop extension 56 that is provided to allow the consumer access to the filter member 60, filter support member 42 assembly.

Figure 3:
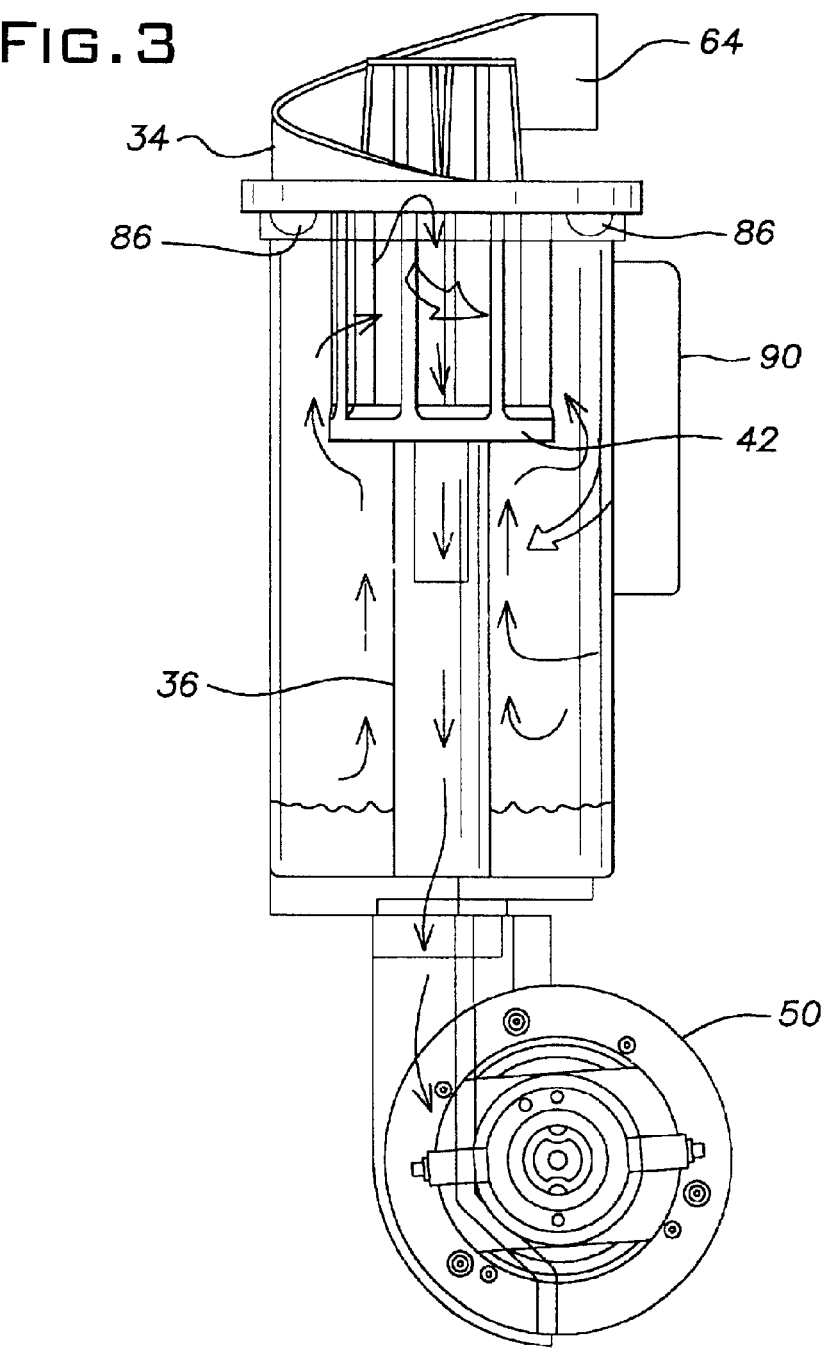
FIG. 3 is a side perspective view of the assembly portion of FIG. 2.

As seen in FIGS. 2, 3 and 4, the component of the improved filtration arrangement of the present invention that begins the filtration process is the cyclonic member 34. Cyclonic member 34 covers the dustcup 26 and filter assembly 40 in a manner so as to create a compression seal against the top of the filter assembly 40. A sealing gasket 62 shown in FIG. 4, is disposed around the perimeter of the inside surface of the cyclonic member 34 and creates an airtight seal onto the top surface of the dustcup flange when the cyclonic member 34 is mated to the dustcup 26. This seal is further enhanced when a negative pressure is created by the suction motor/fan assembly 50 and acts to tighten the engagement between the cyclonic member 34 and the dustcup 26.

The cyclonic member 34 has an opening 64 as seen in FIGS. 3 and 4; the opening 64 receives the air and dust/debris mixture that is in route to the inside of the dustcup 26. The air and dirt/debris mixture is communicated to the opening 64 from the floor-engaging base member 12 via hose member 22, the base member 12 and hose member 22 forming a first air path for communicating dirt laden air to the cyclonic member 34. As depicted, the opening 64 is offset from the axial center of the cyclonic member 34 and is in fact, disposed at the outermost diametrical position of the cyclonic member 34. It should be understood however that the opening can be placed in a different position relative to the axial center of the cyclonic member 34 and still achieve the function of imparting a cyclonic action or rotational motion to the air and dust/debris mixture entering the opening 64. From the opening 64, a uniform width, curved inclined channel 66 is formed in the cyclonic member 34, such that the channel 66 helically converges to the bottom of the cyclonic member 34 in an arcuate manner. It should be understood that the amount of the arc is shown as approximately 360 degrees but this value can be reduced as well and still result in the cyclonic action being imparted to the air and dirt/debris mixture. Additionally, though illustrated and discussed as a uniform width channel 66, it is contemplated that a channel with a non-uniform width could be provided and still achieve the rotational motion of the airflow that is within the scope of the present invention. The inside surface 68 of the outside channel wall is shown to be in vertical alignment with the inside surface of the outer wall of the dustcup 26. The tangential entry of the air and dirt/debris mixture into the opening 64 of the cyclonic member 34 imparts a rapid circular or cyclonic action to the dirt laden air and has the effect of slinging the more dense matter with a centrifugal force to the outer wall of the dustcup 26. The downward biased helical top surface of channel 66 spirals the dirt laden air toward the bottom of dustcup 26 with increased speed thereby reducing the dwell time that the denser matter is in close proximity to the filter assembly 40. A hood 70 can be formed at approximately the axial center of the cyclonic member 34 in order to accommodate the height of the loop extension 56.

Figure 5A:
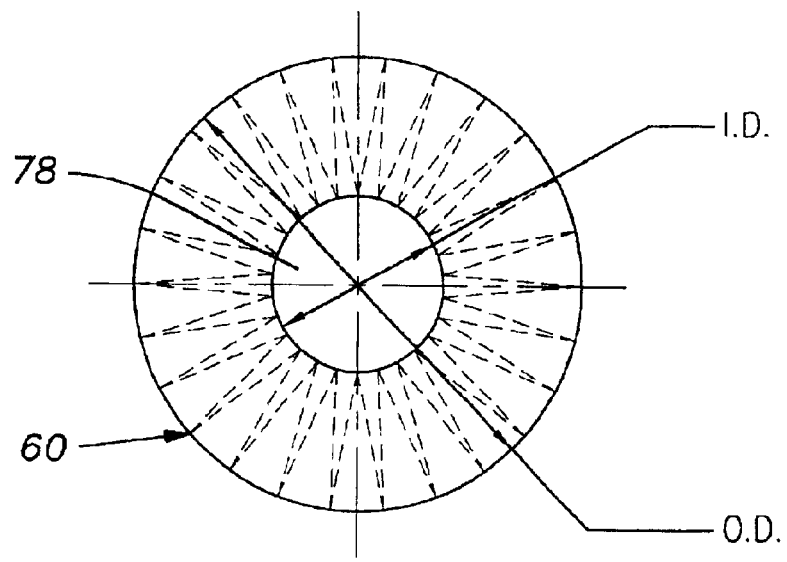
FIGS. 5*a* and 5*b* are respectively, a top and front perspective view of the filter member of the present invention.
Figure 5B:
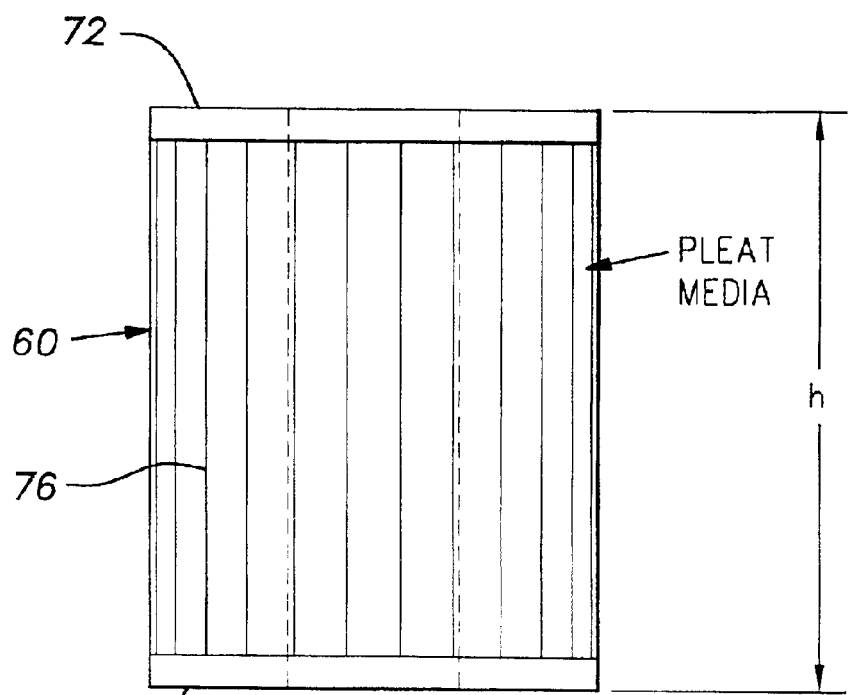

As seen in FIGS. 5a and 5b, the filter member 60 of the filter assembly 40 is generally cylindrical in shape and includes a top and bottom surface 72, 74. Top and bottom surfaces 72, 74 are generally planar surface areas and are separated by an air-permeable filter media configured in a pleated form 76. Although the embodiment of FIGS. 5a and 5b includes a cylindrical filter using a pleated form media 76, other forms of filter media could be readily substituted; for instance, a porous foam filter media can be utilized and still fall within the scope of the present invention. The pleated form 76 is wrapped into a circle, with the pleats running in an axial direction (see FIG. 5a). The pleated form is then sealed inside the top and bottom surfaces 72, 74.

The height "h" and the inner diameter "i.d." and outer diameter "o.d." dimensions of the filter member 60 are selected so that sufficient surface area of filter media is achieved but yet, does not cause that the filter assembly 40 to extend into the dustcup 26 in a way that would interfere with the cyclonic air flow within the dustcup 26 or, reduce the space in which dirt/debris is collected at the bottom of the dustcup 26. In this manner, the present invention thereby allows sufficient space at the bottom of the dustcup 26 for dirt and debris to reside and further, allows a filter-free spacing along the bottom portion of the air tube 36 so as to minimize air turbulence within the bottom region of the dustcup 26. A further advantage to the size and placement of the filter assembly 40 within the dustcup 26 is that a higher rotational velocity of the cyclonic airflow occurs in the smaller sectional area near the filter assembly 40 thus keeping away from the filter assembly 40, dust particles that first enter the dustcup 26. In other words, the sectional area between the outside of the filter assembly 40 and the inside wall of the dustcup 26 is small relative to the more open chamber area beneath the filter assembly 40. As such, this small sectional area maintains a higher rotational velocity near the filter assembly 40 to help effect maximum particle separation in the upper area and thereby prolong the life of the filter member 60 that could otherwise occur due to dust and lint clogging the pores of the filter member 60. A resilient potting material (see reference number 100 in FIG. 7) can be used to seal the top and bottom surfaces 72, 74 to the pleated form 76. When the filter member 60 is installed onto the filter support member 42, the bottom surface 74 of the filter member 60 is sealed against base 54 (see FIG. 4) so that air must pass through the filter media 76 for cleaning before it can proceed to the suction motor/fan assembly 50. The filter member 60 has a cylindrical void extending completely through its center; the central void 78 is concentric with the outside diameter of the filter member 60. It is contemplated herein that the pleated form can be made of spun bonded polyester or similar synthetic permanent and permeable media and can therefore allow the filter member 60 to be considered permanent. By such an arrangement, the filter member 60 need not be replaced regularly but in fact can be cleaned by the consumer so as to restore the filter member 60 to an "as new" condition so that it can be reused.

Figure 8:
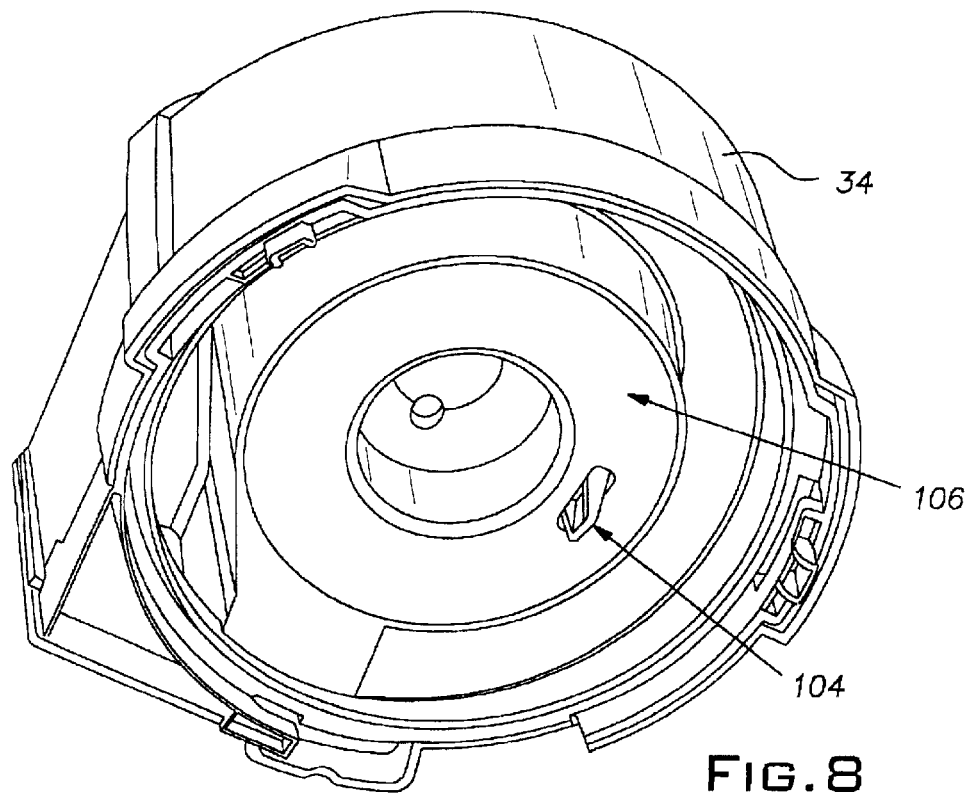
FIG. 8 is a perspective view of the bottom portion of one embodiment of the cyclonic member of the present invention.
Figure 7:
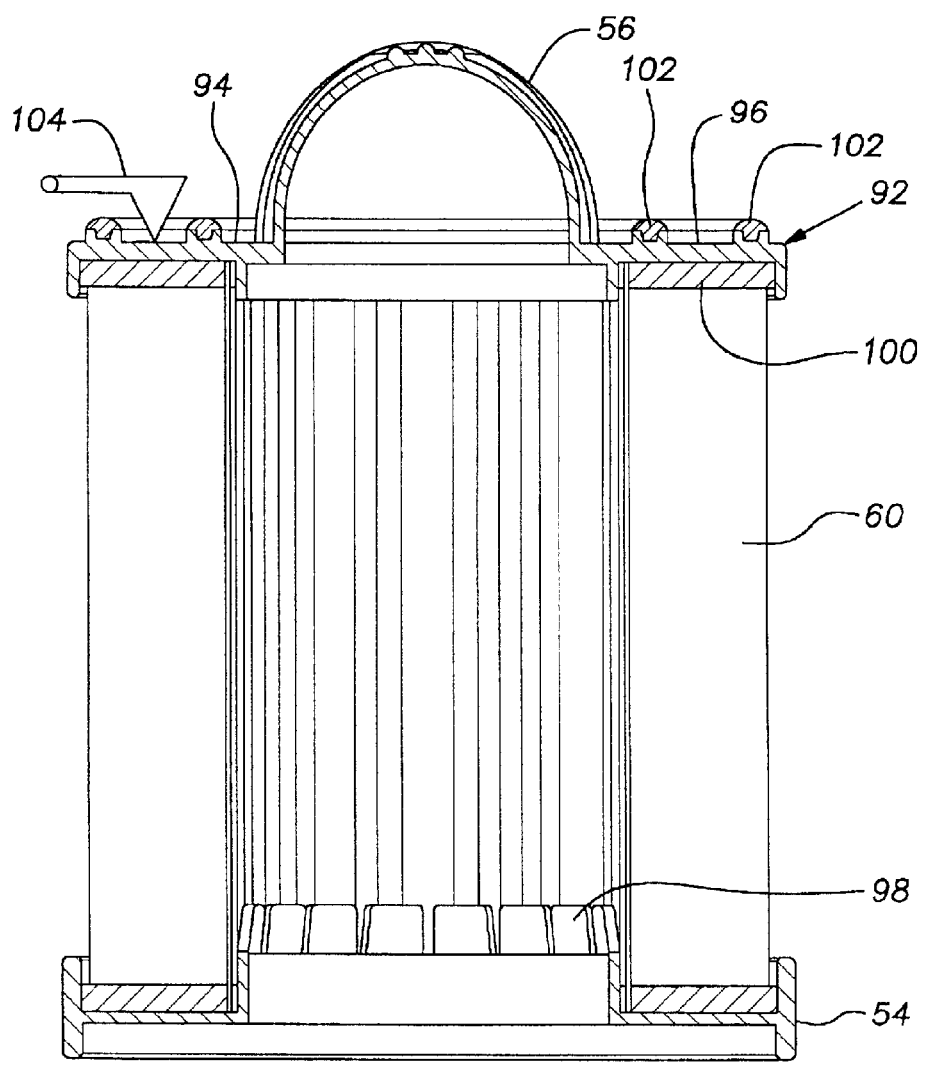
FIG. 7 is an elevational view of an alternate embodiment of the filter assembly portion of the present invention.

An alternate configuration filter assembly 92 is illustrated in FIG. 7. This alternate filter assembly 92 is substantially similar to the filter assembly 40 of FIGS. 2 through 4 but includes several additional features as will now be described. Filter assembly 92 includes a molded plastic filter top 94 that has loop handle 56 molded integrally thereto. Filter top 94 further includes two concentric annular gasket rings 102 that are separated by a predetermined diametric distance. When the filter assembly 92 is mounted in the vacuum cleaner 10, dead air space is created between these two annular gasket rings. A filter-in-place arm 104 contacts the filter top 94 in this dead air region; the filter-in-place arm 104 is effective so as to prevent the consumer from completing the reattachment of the dustcup 26 to the body portion 18 unless the filter assembly 92 has been reinserted onto the air tube 36. The filter-in-place arm 104 can be keyed to a projection (not shown) that, unless disengaged by the filter-in-place arm 104, acts to prevent closure of the outer cover member 58 (see FIG. 1) over the dustcup 26, cyclonic member 34 configuration. It is necessary to dispose the filter-in-place arm 104 within the dead air space so as to prevent the negative pressure of the suction motor/fan assembly 50 from inadvertently actuating the filter-in-place arm 104 during normal operation of the vacuum cleaner 10. As an alternative to the use of annular gasket rings 102 for creating the dead air space for the filter-in-place arm 104, it is possible to use a foam gasket 106 (see FIG. 8) as a means of isolating the filter-in-place arm 104 from the negative pressure of the suction motor/fan assembly 50 As further seen in FIG. 7, the alternate filter assembly 92 also includes a plurality of flexible grippers 98 formed on the filter base 54; the flexible grippers 98 provide an additional holding force of the filter assembly 92 against air tube 36.

Figure 6:
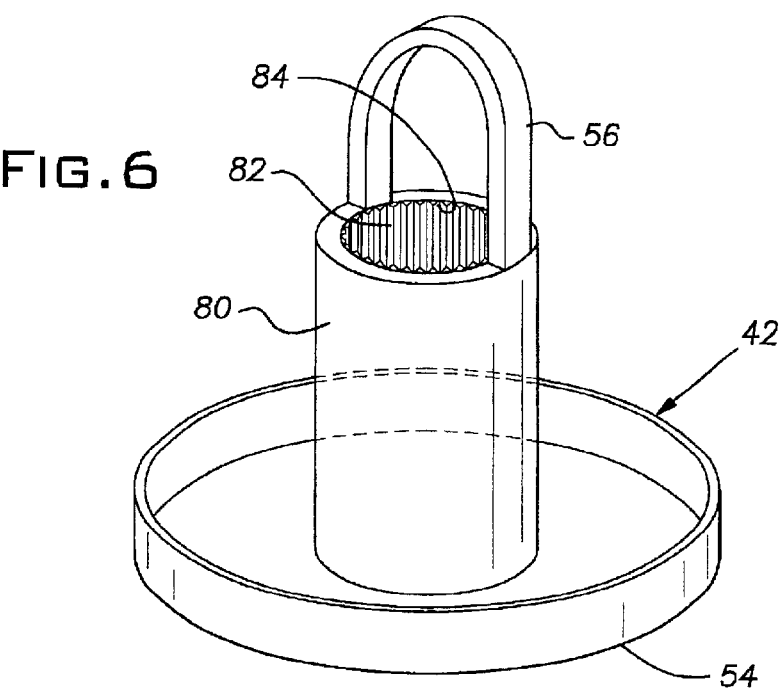
FIG. 6 is an elevational view of a filter support portion of the present invention.

As seen in FIG. 6, the filter support member 42 is shown in detail however, without the ribs 44 or meshing 46 as shown in FIG. 4. All other features of the filter support member 42 of FIG. 6 are intended to be the same as those shown in FIG. 4. The filter support member 42 is used to mount the filter member 60 to the top-most portion of the air tube 36. When viewed from the top, the filter support member 42 is essentially round in shape. Filter support member 42 has a tubular center portion 80 that begins at the base 54 and extends upward. A circular opening 82 is formed at the top of tubular center portion 80 and has formed around the periphery thereof, a flange 84 that extends towards the center axis of the tubular center portion 80 so as to form an annular lip configuration. When the filter support member 42 is disposed on the air tube 36, the annular lip 84 engages the top surface of the air tube 36 creating a face-to-face seal and rigid support for the filter assembly 40.

The operation of the vacuum cleaner having an improved filtration arrangement 10 will now be described with specific reference to FIG. 3. As seen in FIG. 3, the filter member 60 and filter support member 42 are first mounted on the top portion of the air tube 36. It is also possible to first install the filter support member 42 and then insert filter member 60 onto the filter support member 42. The operation of installing the filter assembly 40 onto the air tube 36 does not require any alignment or registration of the components, it merely requires fitting the round opening 82 of the filter support member 42 onto the top portion of the air tube 36. The top portion of the air tube 36 terminates a fixed distance below the top of the filter assembly 40 so that air passing through the pleated filter media 76 has a passageway into the interior of the air tube 36 and then on to the suction motor/fan assembly 50.

Once the filter assembly 40 is positioned onto the air tube 36, the cyclonic member 34 is affixed to the top of the dustcup 26. The cyclonic member 34 can be releasably secured to the top of the dustcup 26 by means of two or more rotation interlock tabs 86 located around the outside perimeter of the dustcup 26 and cyclonic member 34. The interlock tabs 86 are oriented in a way so that proper registration between the dustcup 26 and cyclonic member 34 must be achieved before there is closure between the dustcup 26 and cyclonic member 34.

When the cyclonic member 34 is properly affixed to the dustcup 26, an intentional interference is created between an annular ring 88 (see FIG. 4) formed on the underside of the cyclonic member 34 and the top surface 72 of the filter member 60. Annular ring 88 displaces the compressible resilient potting end of the filter member 60 to insure a complete seal in this region. The assembly operations discussed herein can be reversed; that, disassembly of the cyclonic member 34 from the dustcup 26 and removal of the filter assembly 40 from the air tube 36 can be accomplished thereby rendering routine servicing operations (i.e. emptying the dustcup 26, cleaning filter member 60) essentially fool-proof. A handle member 90 can be provided on the side region of the dustcup 26 to facilitate handling by the consumer during the emptying operation.

Although the hereinabove described embodiment of the invention constitutes the preferred embodiment, it should be understood that modifications can be made thereto without departing from the scope of the invention as set forth in the appended claims. For example, it is possible to provide an alternate arrangement for imparting rotational motion to the airflow into the dustcup 26; that is, instead of a curved, inclined surface mounted in a sealingly engaged relation to the dustcup 26, an alternate cyclonic chamber can be mounted to the body portion of the vacuum cleaner and still practice the features of the present invention.

What is claimed is:

1. A vacuum cleaner with an improved filtration arrangement, comprising:
   a) a floor engaging base unit;
   b) a body portion pivotally mounted on said base unit;
   c) a suction motor/fan assembly mounted in one of the base unit and body portion;
   d) a dust cup mounted on and detachable from the body portion, the dust cup having a hollow, central air tube affixed to and extending upward from a bottom end of the dust cup to approximately the height of the top of a sidewall of the dust cup;
   e) a filter assembly having a filter medium, the filter assembly:
      i) being positioned within the dust cup, wherein the filter assembly is entirely located at a top portion of the dust cup,
      ii) having an opening that accepts a substantial length of an upper portion of the air tube, with a bottom portion of the air tube remaining uncovered, and
      iii) being removable from the air tube;
   f) a cyclonic cover member removably covering the dust cup and the filter assembly within the dust cup; and
   g) a first air path for communicating dirt laden air from the base unit to the cyclonic cover member; and
   wherein the cyclonic cover member:
      i) is removably disposed over the top of and sealed against the dust cup,
      ii) is engaged with the top of the filter assembly,
      iii) is detachable from the body portion together with the filter assembly and the dust cup, and
      iv) has a helical underside surface forming a downward facing helical channel opening into the upper end of the dust cup, the downward facing helical channel spiraling dirt laden air toward the bottom of the dust cup; and wherein the dirt laden air flows cyclonically in the dust cup and to the filter medium of the filter assembly, with an inside portion of the filter assembly and the air tube forming at least part of a second air path from inside the filter assembly down to the suction motor/fan assembly.

2. The vacuum cleaner with an improved filtration arrangement according to claim 1, wherein the air tube is molded integrally with the dust cup.

3. The vacuum cleaner with an improved filtration arrangement according to claim 1, wherein the air tube is a separate air tube that is affixed inside the dust cup.

4. The vacuum cleaner with an improved filtration arrangement according to claim 1, wherein the filter assembly comprises a lower filter support member positioned between the air tube and the filter medium, the lower filter support member having an opening that accepts an upper portion of the air tube so as to ensure a secure fitting relationship between the air tube and the filter support member.

5. The vacuum cleaner with an improved filtration arrangement according to claim 4, wherein the opening of the lower filter support member is formed in part by flexible grippers that engage an upper portion of the air tube.

6. The vacuum cleaner with an improved filtration arrangement according to claim 1, wherein the filter medium of the filter assembly comprises a pleated filter medium.

7. The vacuum cleaner with an improved filtration arrangement according to claim 1, wherein the suction motor/fan assembly is mounted in the body portion at a position directly beneath the dust cup.

8. The vacuum cleaner with an improved filtration arrangement according to claim 1, further comprising a final filter disposed between the suction motor/fan assembly and atmosphere.

9. The vacuum cleaner with an improved filtration arrangement according to claim 1, further comprising a HEPA filter disposed between the suction motor/fan assembly and atmosphere.

10. The vacuum cleaner with an improved filtration arrangement according to claim 1, wherein the filter assembly comprises an upper filter support member positioned between the cyclonic cover member and the filter medium.

11. The vacuum cleaner with an improved filtration arrangement according to claim 1, wherein the filter assembly comprises a lower filter support member positioned between the air tube and the filter medium, the lower filter support member having an opening that accepts an upper portion of the air tube so as to ensure a secure fitting relationship between the air tube and the filter support member, and wherein the filter assembly further comprises an upper filter support member positioned between the cyclonic cover member and the filter medium.

12. A vacuum cleaner with an improved filtration arrangement, comprising:
   a) a floor engaging base unit;
   b) a body portion pivotally mounted on said base unit;
   c) a suction motor/fan assembly mounted in the body portion at a position directly beneath the dust cup;
   d) a dust cup mounted on and detachable from the body portion, the dust cup having a hollow, central air tube affixed to and extending upward from a bottom end of the dust cup to approximately the height of the top of a sidewall of the dust cup, wherein the dust cup comprises an external rib portion formed at a bottommost portion of the dust cup, the rib portion of the dust cup contacting a gasket member disposed between the suction motor/fan assembly and the dust cup to provide an airtight seal between the dust cup and suction motor/fan assembly;

e) a filter assembly having a filter medium, the filter assembly:
   i) being positioned within the dust cup,
   ii) having an opening that accents a substantial length of an upper portion of the air tube, with a bottom portion of the air tube remaining uncovered, and
   iii) being removable from the air tube;

f) a cyclonic cover member removably covering the dust cup and the filter assembly within the dust cup; and g) a first air path for communicating dirt laden air from the base unit to the cyclonic cover member, wherein the cyclonic cover member:
   i) is removably disposed over the top of and sealed against the dust cup,
   ii) is engaged with the top of the filter assembly,
   iii) is detachable from the body portion together with the filter assembly and the dust cup, and
   iv) has a helical underside surface forming a downward facing helical channel opening into the upper end of the dust cup, the downward facing helical channel spiraling dirt laden air toward the bottom of the dust cup, wherein the dirt laden air flows cyclonically in the dust cup and to the filter medium of the filter assembly, with an inside portion of the filter assembly and the air tube forming at least part of a second air path from inside the filter assembly down to the suction motor/fan assembly.

13. A vacuum cleaner with an improved filtration arrangement, comprising:
   a) a floor engaging base unit;
   b) a body portion pivotally mounted on said base unit;
   c) a suction motor/fan assembly mounted in one of the base unit and body portion;
   d) a dust cup mounted on and detachable from the body portion, the dust cup having a hollow, central air tube affixed to and extending upward from a bottom end of the dust cup to approximately the height of the top of a sidewall of the dust cup;
   e) a filter assembly having a filter medium, the filter assembly:
      i) being positioned within the dust cup,
      ii) having an opening that accepts a substantial length of an upper portion of the air tube, with a bottom portion of the air tube remaining uncovered, and
      iii) being removable from the air tube;
   f) a cyclonic cover member removably covering the dust cup and the filter assembly within the dust cup;
   g) a first air path for communicating dirt laden air from the base unit to the cyclonic cover member, wherein the cyclonic cover member:
      i) is removably disposed over the top of and sealed against the dust cup,
      ii) is engaged with the top of the filter assembly,
      iii) is detachable from the body portion together with the filter assembly and the dust cup, and
      iv) has a helical underside surface forming a downward facing helical channel opening into the upper end of the dust cup, the downward facing helical channel spiraling dirt laden air toward the bottom of the dust cup, wherein the dirt laden air flows cyclonically in the dust cup and to the filter medium of the filter assembly, with an inside portion of the filter assembly and the air tube forming at least part of a second air path from inside the filter assembly down to the suction motor/fan assembly; and
   h) a filter-in-place member that cooperatively engages a portion of the filter assembly so as to prevent a user from reattaching the dust cup and the cyclonic cover member to the body portion unless the filter assembly is in place on the air tube.

14. The vacuum cleaner with an improved filtration arrangement according to claim 13, wherein the filter-in-place member comprises a filter-in-place arm that contacts the filter assembly in a dead air region formed by at least one gasket.

15. A vacuum cleaner with an improved filtration arrangement, comprising:
   a) a floor engaging base unit;
   b) a body portion pivotally mounted on said base unit;
   c) a suction motor/fan assembly mounted in one of the base unit and body portion;
   d) a dust cup mounted on and detachable from the body portion, the dust cup having a hollow, central air tube affixed to and extending upward from a bottom end of the dust cup to approximately the height of the top of a sidewall of the dust cup;
   e) a filter assembly having a filter medium, the filter assembly:
      i) being positioned within the dust cup,
      ii) having an opening that accepts a substantial length of an upper portion of the air tube, with a bottom portion of the air tube remaining uncovered, and
      iii) being removable from the air tube;
   f) a cyclonic cover member removably covering the dust cup and the filter assembly within the dust cup, wherein the filter assembly further comprises an upper filter support member positioned between the cyclonic cover member and the filter medium and further wherein the cyclonic cover member comprises a filter-in-place member that cooperatively engages the upper filter support member so as to prevent a user from reattaching the dust cup and the cyclonic cover member to the body portion unless the filter assembly is in place on the air tube; and
   g) a first air path for communicating dirt laden air from the base unit to the cyclonic cover member, wherein the cyclonic cover member:
      i) is removably disposed over the top of and sealed against the dust cup,
      ii) is engaged with the top of the filter assembly,
      iii) is detachable from the body portion together with the filter assembly and the dust cup, and
      iv) has a helical underside surface forming a downward facing helical channel opening into the upper end of the dust cup, the downward facing helical channel spiraling dirt laden air toward the bottom of the dust cup, wherein the dirt laden air flows cyclonically in the dust cup and to the filter medium of the filter assembly, with an inside portion of the filter assembly and the air tube forming at least part of a second air path from inside the filter assembly down to the suction motor/fan assembly.

16. The vacuum cleaner with an improved filtration arrangement according to claim 15, wherein the filter-in-place member comprises a filter-in-place arm that contacts the upper filter support member.

17. The vacuum cleaner with an improved filtration arrangement according to claim 15, wherein the filter-inplace member comprises a filter-in-place arm that contacts the upper filter support member in a dead air region formed by at least one gasket between the upper support member and the cyclone cover member.

18. A vacuum cleaner with an improved filtration arrangement, comprising:
   a) a floor engaging base unit;
   b) a body portion pivotally mounted on said base unit;
   c) a suction motor/fan assembly mounted in one of the base unit and body portion;
   d) a dust cup mounted on and detachable from the body portion, the dust cup having a hollow, central air tube affixed to and extending upward from a bottom end of the dust cup to approximately the height of the top of a sidewall of the dust cup;
   e) a filter assembly having a filter medium, the filter assembly:
      i) being positioned within the dust cup,
      ii) having an opening that accepts a substantial length of an upper portion of the air tube, with a bottom portion of the air tube remaining uncovered, and
      iii) being removable from the air tube, wherein the filter assembly further comprises a lower filter support member positioned between the air tube and the filter medium, the lower filter support member having an opening that accepts an upper portion of the air tube so as to ensure a secure fitting relationship between the air tube and the filter support member, and an upper filter support member positioned between the cyclonic cover member and the filter medium;
   f) a cyclonic cover member removably covering the dust cup and the filter assembly within the dust cup; and
   g) a first air path for communicating dirt laden air from the base unit to the cyclonic cover member, wherein the cyclonic cover member:
      i) is removably disposed over the top of and sealed against the dust cup,
      ii) is engaged with the top of the filter assembly,
      iii) is detachable from the body portion together with the filter assembly and the dust cup,
      iv) has a helical underside surface forming a downward facing helical channel opening into the upper end of the dust cup, the downward facing helical channel spiraling dirt laden air toward the bottom of the dust cup, and
      v) further comprises a filter-in-place member that cooperatively engages the upper filter support member so as to prevent a user from reattaching the dust cup and the cyclonic cover member to the body portion unless the fitter assembly is in place on the air tubes, wherein the dirt laden air flows cyclonically in the dust cup and to the filter medium of the filter assembly, with an inside portion of the filter assembly and the air tube forming at least part of a second air path from inside the filter assembly down to the suction motor/fan assembly.

19. The vacuum cleaner with an improved filtration arrangement according to claim 18, wherein the lower filter support member and the upper filter support member are affixed to and sealed to the filter medium of the filter assembly.

20. A vacuum cleaner, comprising:
   a) a housing;
   b) a suction motor/fan assembly associated with the housing;
   c) a dirt receptacle, the dirt receptacle being removably attached to the housing;
   d) a filter assembly that is removable from the housing with the dirt receptacle as a unit, the filter assembly being removable from the dirt receptacle;
   e) a first air path for communicating an air stream drawn by the suction motor/fan assembly from the housing to the dirt receptacle, wherein the filter assembly filters the air stream when the filter assembly is in place in the dirt receptacle; and
   f) a filter-in-place member cooperating with the filter assembly and the housing to prevent a user from reattaching the dirt receptacle to the housing unless the filter assembly is in place in the dirt receptacle.

21. A vacuum cleaner, comprising:
   a) a housing;
   b) a suction motor/fan assembly associated with the housing;
   c) a dirt receptacle, the dirt receptacle being removably attached to the housing;
   d) a filter assembly that is removable from the housing with the dirt receptacle as a unit, the filter assembly being removable from the dirt receptacle;
   e) a first air path for communicating an air stream drawn by the suction motor/fan assembly from the housing to the dirt receptacle, wherein the filter assembly filters the air stream when the filter assembly is in place in the dirt receptacle; and
   f) a filter-in-place member cooperating with the filter assembly and the housing to prevent a user from reattaching the dirt receptacle to the housing unless the filter assembly is in place in the dirt receptacle, wherein the filter-in-place member comprises a filter-in-place arm that contacts the filter assembly when the filter assembly is in place.

22. The vacuum cleaner according to claim 21, wherein the filter-in-place arm contacts the filter assembly in a dead air region formed by at least one gasket when the filter assembly is in place.

23. A vacuum cleaner, comprising:
   a) a housing;
   b) a suction motor/fan assembly associated with the housing;
   c) a dirt receptacle, the dirt receptacle being removably attached to the housing;
   d) a filter assembly that is removable from the housing with the dirt receptacle as a unit, the filter assembly being removable from the dirt receptacle;
   e) a first air path for communicating an air stream drawn by the suction motor/fan assembly from the housing to the dirt receptacle, wherein the filter assembly filters the air stream when the filter assembly is in place in the dirt receptacle;
   f) a filter-in-place member cooperating with the filter assembly and the housing to prevent a user from reattaching the dirt receptacle to the housing unless the filter assembly is in place in the dirt receptacle; and
   g) a cover member removably covering the dirt receptacle and the filter assembly, the cover member, the dirt receptacle and the filter assembly being removable from the housing together as a unit, wherein the filter-in-place member cooperates with the filter assembly, the housing, and the cover member to prevent a user from reattaching the dirt receptacle and cover member to the housing unless the filter assembly is in place in the dirt receptacle.

24. The vacuum cleaner according to claim 23, wherein the filter-in-place member comprises a filter-in-place arm attached to the cover member that contacts the filter assembly when the filter assembly is in place.

25. The vacuum cleaner according to claim 23, wherein the filter-in-place member comprises a filter-in-place arm attached to the cover member that contacts the filter assembly in a dead air region formed by at least one gasket when the filter assembly is in place.

26. The vacuum cleaner according to claim 23, wherein the dirt receptacle further comprises an air tube extending into the dirt receptacle from a wall of the dirt receptacle, wherein the filter assembly filters the air stream when the filter assembly is in place on the air tube, and wherein the filter-in-place member cooperates with the filter assembly, the housing, and the cover member to prevent a user from reattaching the dirt receptacle to the housing unless the filter assembly is in place on the air tube.

27. The vacuum cleaner according to claim 26, wherein the filter-in-place member comprises a filter-in-place arm attached to the cover member that contacts the filter assembly when the filter assembly is in place.

28. The vacuum cleaner according to claim 26, wherein the filter-in-place member comprises a filter-in-place arm attached to the cover member that contacts the filter assembly in a dead air region formed by at least one gasket when the filter assembly is in place.

29. The vacuum cleaner according to claim 20, wherein the dirt receptacle further comprises an air tube extending into the dirt receptacle from a wall of the dirt receptacle, wherein the filter assembly filters the air stream when the filter assembly is in place on the air tube, and wherein the filter-in-place member cooperates with the filter assembly and the housing to prevent a user from reattaching the dirt receptacle to the housing unless the filter assembly is in place on the air tube.

30. A vacuum cleaner, comprising:
   a) a housing;
   b) a suction motor/fan assembly associated with the housing;
   c) a dirt receptacle, the dirt receptacle being removably attached to the housing and further comprising an air tube extending into the dirt receptacle from a wall of the dirt receptacle;
   d) a filter assembly that is removable from the housing with the dirt receptacle as a unit, the filter assembly being removable from the dirt receptacle, wherein the filter assembly filters the air stream when the filter assembly is in place on the air tube;
   e) a first air path for communicating an air stream drawn by the suction motor/fan assembly from the housing to the dirt receptacle, wherein the filter assembly filters the air stream when the filter assembly is in place in the dirt receptacle; and
   f) a filter-in-place member cooperating with the filter assembly and the housing to prevent a user from reattaching the dirt receptacle to the housing unless the filter assembly is in place in the dirt receptacle and on the air tube, wherein the filter-in-place member comprises a filter-in-place arm that contacts the filter assembly when the filter assembly is in place.

31. The vacuum cleaner according to claim 30, wherein the filter-in-place arm contacts the filter assembly in a dead air region formed by at least one gasket when the filter assembly is in place.

32. A vacuum cleaner with an improved filtration arrangement, comprising:
   a) a floor engaging base unit;
   b) a body portion pivotally mounted on said base unit;
   c) a suction motor/fan assembly mounted in one of the base unit and body portion wherein the suction motor/fan assembly is mounted in the body portion at a position directly beneath the dust cup;
   d) a dust cup mounted on and detachable from the body portion, the dust cup having a hollow, central air tube affixed to and extending upward from a bottom end of the dust cup to approximately the height of the top of a sidewall of the dust cup, wherein the dust cup comprises an external rib portion formed at a bottommost portion of the dust cup, the rib portion of the dust cup contacting a gasket member disposed between the suction motor/fan assembly and the dust cup to provide an airtight seal between the dust cup and suction motor/fan assembly;
   e) a filter assembly having a filter medium, the filter assembly:
      i) being positioned within the dust cup,
      ii) having an opening that accepts a substantial length of an upper portion of the air tube, with a bottom portion of the air tube remaining uncovered,
      iii) being removable from the air tube,
      iv) having a lower filter support member positioned between the air tube and the filter medium, the filter support member having an opening that accepts an upper portion of the air tube so as to ensure a secure fitting relationship between the air tube and the filter support member,
      v) having an upper filter support member positioned between the cyclonic cover member and the filter medium and further wherein the cyclonic cover member further comprises a filter-in-place member that cooperatively engages the upper filter support member so as to prevent a user from reattaching the dust cup and the cyclonic cover member to the body portion unless the filter assembly is in place on the air tube, wherein the lower filter support member and the upper filter support member are affixed to and sealed to the filter medium of the filter assembly, and
      vii) having the filter medium of the filter assembly comprise a pleated filter medium;
   f) a cyclonic cover member removably covering the dust cup and the filter assembly within the dust cup;
   g) a first air path for communicating dirt laden air from the base unit to the cyclonic cover member; wherein the cyclonic cover member:
      i) is removably disposed over the top of and sealed against the dust cup,
      ii) is engaged with the top of the filter assembly,
      iii) is detachable from the body portion together with the filter assembly and the dust cup, and
      iv) has a helical underside surface forming a downward facing helical channel opening into the upper end of the dust cup, the downward facing helical channel spiraling dirt laden air toward the bottom of the dust cup; and
wherein the dirt laden air flows cyclonically in the dust cup and to the filter medium of the filter assembly, with an inside portion of the filter assembly and the air tube forming at least part of a second air path from inside the filter assembly down to the suction motor/fan assembly; and
   h) a HEPA filter disposed between the suction motor/fan assembly and atmosphere.

33. The vacuum cleaner with an improved filtration arrangement according to claim 32, wherein the filter-in-place member comprises a filter-in-place arm that contacts the upper filter support member.

34. The vacuum cleaner with an improved filtration arrangement according to claim 32, wherein the filter-in-place member comprises a filter-in-place arm that contacts the upper filter support member in a dead air region formed by at least one gasket between the upper support member and the cyclone cover member.

35. The vacuum cleaner with an improved filtration arrangement according to claim 32, wherein the opening of the lower filter support member is formed in part by flexible grippers that engage an upper portion of the air tube.

* * * * *

UNITED STATES PATENT AND TRADEMARK OFFICE
CERTIFICATE OF CORRECTION

PATENT NO. : 6,829,804 B2
DATED : December 14, 2004
INVENTOR(S) : Sepke

It is certified that error appears in the above-identified patent and that said Letters Patent is hereby corrected as shown below:

Title page,
Item [56], References Cited, OTHER PUBLICATIONS, please insert the following:
-- IonaCare Fantom™ Model F-9000, Owner's Manual (© 1991) --.

Column 11,
Line 50, please delete "tubes" and insert therefor -- tube --.

Signed and Sealed this

Thirty-first Day of May, 2005

JON W. DUDAS
*Director of the United States Patent and Trademark Office*